United States Patent
Wu et al.

(10) Patent No.: US 6,566,840 B1
(45) Date of Patent: May 20, 2003

(54) METHOD AND SYSTEM FOR SELF-CALIBRATION OF AN INDUCTION MACHINE DRIVE

(75) Inventors: Bo Wu, Northville, MI (US); Michael W. Degner, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/073,477

(22) Filed: Feb. 11, 2002

(51) Int. Cl.⁷ .................................................. H02P 1/24
(52) U.S. Cl. ...................... 318/727; 318/254; 318/439; 318/138
(58) Field of Search ................................ 318/727, 138, 318/254, 439, 800, 801, 802, 803, 804

(56) References Cited

U.S. PATENT DOCUMENTS

| | | | |
|---|---|---|---|
| 5,032,771 A | * 7/1991 | Kerkman et al. | ............. 318/52 |
| 5,883,344 A | 3/1999 | Colby et al. | |
| 5,965,995 A | * 10/1999 | Seibel et al. | ................. 318/805 |
| 6,014,006 A | 1/2000 | Stuntz et al. | |
| 6,286,473 B1 | 9/2001 | Zaremba | |
| 6,388,419 B1 | * 5/2002 | Chen et al. | ................. 318/727 |

* cited by examiner

Primary Examiner—Karen Masih
(74) Attorney, Agent, or Firm—Brooks & Kushman; Carlos Hanze

(57) ABSTRACT

A method and system for estimating slip gain for use in the control of torque in a multi-phase induction machine. The slip gain estimate is based on a transient response of the induction machine to torque command changes. The invention is independent of machine parameters other than the slip gain. The method uses a slip gain estimation algorithm that is suited for use either as a self-calibration procedure or a background procedure that continually updates the slip gain during normal operation of the induction machine. The estimation method of the invention is suited for automotive driveline applications, which typically have limited sensor capability and which may present tuning problems associated with high volume production and with slip gain estimates when temperature changes during normal operation.

12 Claims, 17 Drawing Sheets

METHOD AND SYSTEM FOR SELF-CALIBRATION OF AN INDUCTION MACHINE DRIVE

CROSS-REFERENCE TO RELATED APPLICATIONS

This application is related to co-pending U.S. application Ser. No. 10/073,476 filed by Michael W. Degner et al on Feb. 11, 2002, entitled "METHOD AND SYSTEM FOR CONTROLLING TORQUE IN A POWERTRAIN THAT INCLUDES AN INDUCTION MOTOR", Attorney Docket No. 1390 PUS/200-1702. The co-pending application is assigned to the Assignee of this application.

BACKGROUND OF THE INVENTION

1. Field of the Invention

The invention relates to a calibration method and system for use in an induction motor torque controller.

2. Background Art

Electric multi-phase machines have been developed for use in automotive vehicle drivelines including electric vehicles, hybrid vehicles having an internal combustion engine and an induction machine, and fuel cell electric vehicles. Such machines also have been designed for other uses such as for integrated starter/generator units and electric power-assisted steering gears for automotive vehicles. An advantage in using electric machines for such applications include the ability to accommodate increased vehicle electric loads, a potential increased fuel economy, and reduced engine exhaust emissions. Induction machines for these applications are attractive because of their rugged nature and low cost.

The increased use of induction machines for automotive purposes increases the need for self-calibration of the controller. This is desirable because of the inherent variations of the characteristics of the individual machines and the changes in the operating environment such as ambient temperature changes.

In the co-pending patent application identified above, a method and strategy is disclosed for obtaining an estimate of the slip gain and rotor time constant. The slip gain value is a key factor in the performance and efficiency of an indirect fuel-oriented controller, as described in the co-pending application. The advantage of the estimating technique is that it is capable of providing direct estimates of the slip gain independently of any other machine or system parameter. Further, it does not require direct measurement of the torque produced by the machine. The method described in the co-pending application makes possible a tuning of the slip gain using only the sensors and components that already are present in the electric machine drive, such as a speed sensor or a rotor position sensor.

The slip gain and rotor time constant estimation method disclosed in the co-pending application is based on the transient response of the stator voltage after a change in the torque command. The control method does not require a direct measurement of torque being produced by the machine.

SUMMARY OF THE INVENTION

The calibration or tuning of an indirect field-oriented machine drive embodying the present invention can be divided into distinct levels.

At a high level, the calibration procedure used for estimating the slip gain or rotor time constant needs to be repeated for both motoring and generating operation at each of the rotor flux levels and rotor speeds of interest. The slip gains obtained from this test sequence can then be used to form, or make corrections to, a lookup table, a curve-fit, or some other mapping for use during the normal operation of the induction machine drive.

The amount of testing performed at this level depends on the amount of variability seen between individual machines, the reliance on test results from previous machines and test procedures, and the degree of tuning accuracy desired. When a high level of detail and accuracy is required, the self-commissioning procedure would perform the calibration at numerous test points covering the whole operating range of drive.

When just a fine tuning of previously measured gains is desired, which may have been obtained from tests on a different machine, the calibration may be performed at only a limited number of test points. The results of the tuning from these test points would then be extrapolated to correct the gains at the other untested operating conditions. In either case, the calibration procedure for the slip gain estimate should be accurate, reliable and fast. The estimation procedure based on the transient response of the machine to changes in the torque command fits these requirements.

In practicing the invention, the induction machine drive would have a rotor and a fixed stator that forms a torque flow path from a torque input member to a torque output member. The method of the invention comprises the steps of commanding a change in torque on the torque input member, determining commanded q-axis and d-axis stator voltages, calculating the product of the stator voltage and a desired windowing function. The windowing function is used as a multiplier for stator voltage data following a change in a torque command to effect a correctly tuned slip gain estimate.

Parameters, called q and d factors, are calculated for a current transient event as a time integral of a windowed q and d axis stator voltage waveform. Using the q and d factors, a determination is made with respect to whether the estimate of slip gain is accurate. The slip gain estimate then is corrected for a given change in commanded torque, if necessary, based on the q and d factors relative to a slip gain estimate for a correctly tuned drive.

The torque command is repeatedly varied between predetermined values with a predetermined frequency, thereby creating a torque command waveform that causes the slip gain estimate to converge to an accurate, unchanging value.

BRIEF DESCRIPTION OF THE DRAWINGS

FIGS. 3c and 3d are graphs corresponding to FIGS. 3a and 3b when the machine is operating in the motoring mode, FIG. 3c showing the slip gain estimate 20% high and FIG. 3d showing a slip gain estimate 20% low;

FIGS. 10c and 10d show the q-factor and d-factor of the induction machine during motoring operation;

DETAILED DESCRIPTION OF AN EMBODIMENT OF THE INVENTION

Figure 1:
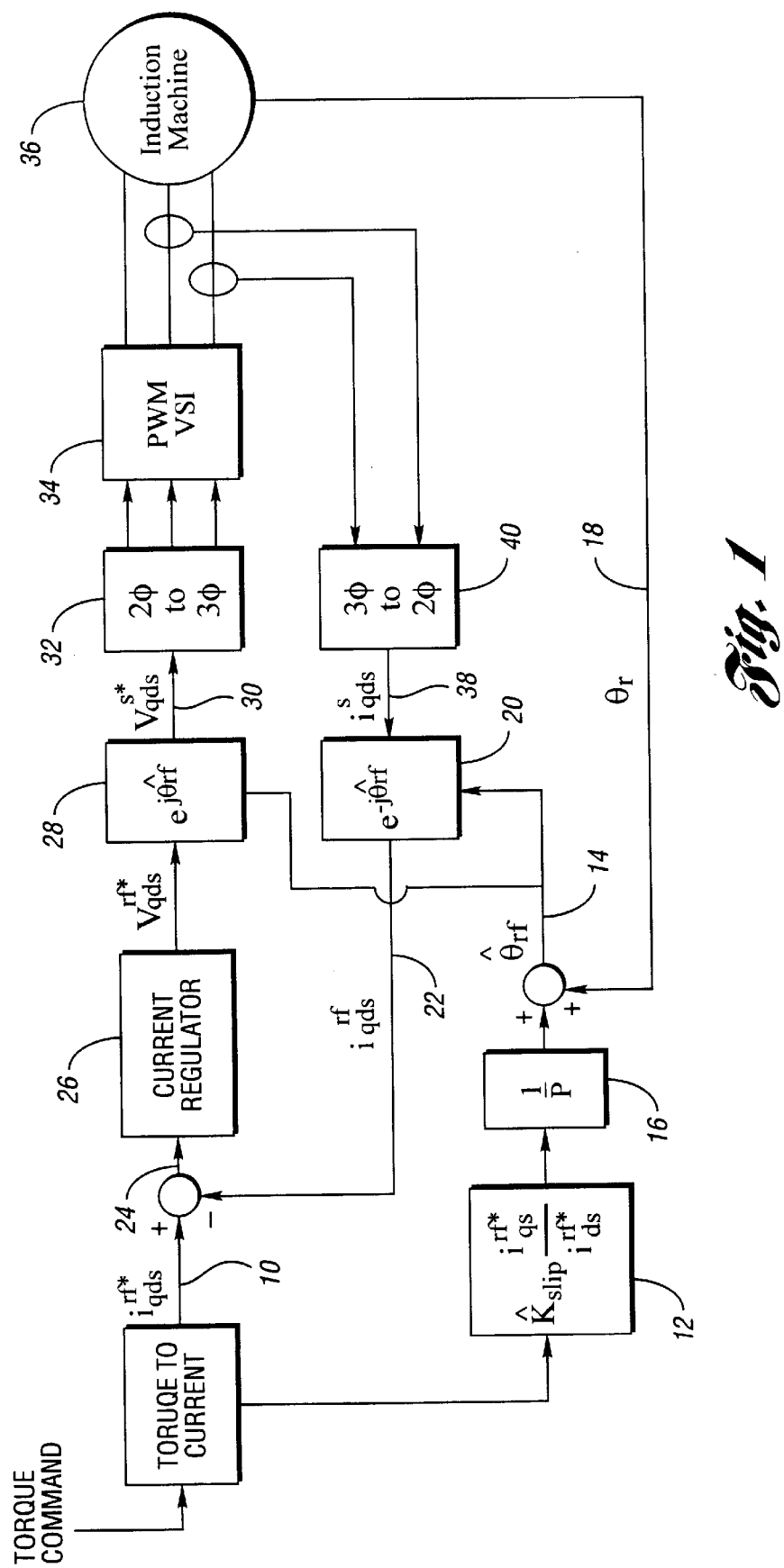
FIG. 1 is a block diagram of an indirect field oriented torque control induction machine drive.

For the purpose of understanding the simulated transient response of the stator voltage that is characteristic of the method of the invention, a steady-state approximation for the flux dynamics will be described. This involves a description of a complex vector model for the electrical dynamics of an induction machine using dq notation in a stationary reference frame, as shown in the following equations.

$$v_{qds}^s = r_s i_{qds}^s + p\lambda_{qds}^s \quad \text{(stator voltage equation) (1)}$$

$$0 = r_r i_{qdr}^s + (p - j\omega_r)\lambda_{qdr}^s \quad \text{(rotor voltage equation) (2)}$$

$$\lambda_{qds}^s = L_s i_{qds}^s + L_m i_{qdr}^s \quad \text{(stator flux linkage equation) (3)}$$

$$\lambda_{qdr}^s = L_m i_{qds}^s + L_r i_{qdr}^s \quad \text{(rotor flux linkage equation), (4)}$$

where p is the differential operator (nominally equivalent to the Laplace variable, s) and $$f_{qds} \equiv f_{qs} = jf_{ds} \quad \text{(complex vector notation) (5)}$$

One of the simplest ways to achieve high-performance torque control of an induction machine is by using the concept of field oriented control. The goal of field orientation is to control independently both the amount of flux and the torque produced in a machine. This independent control is achieved by orienting the stator currents in a machine relative to one of the various machine fluxes, usually the rotor flux.

Transforming (1)–(4) to a reference frame aligned with the rotor flux ($\lambda_{qr}^{rf} = 0$) results in the following equations, which model the machine's behavior:

$$v_{qds}^{rf} = r_s i_{qds}^{rf} + (p + j\omega_e)\lambda_{qds}^{rf} \quad \text{(stator voltage equation) (6)}$$

$$0 = r_r i_{qdr}^{rf} + [p = j(\omega_r - \omega_e)]\lambda_{dr}^{rf} \quad \text{(rotor voltage equation) (7)}$$

$$\lambda_{qds}^{rf} = L_s i_{qds}^{rf} + L_m i_{qdr}^{rf} \quad \text{(stator flux linkage equation) (8)}$$

$$-j\lambda_{dr}^{rf} = L_m i_{qds}^{rf} + L_r i_{qdr}^{rf} \quad \text{(rotor flux linkage equation) (9)}$$

Since the rotor flux is aligned along the d-axis in this reference frame, the rotor flux linkage equation, (9), can be used to solve for a relationship between the q-axis stator and rotor currents, (10), and a simplified rotor flux linkage equation, (11).

$$i_{qr}^{rf} = -\frac{L_m}{L_r} i_{qs}^{rf} \tag{10}$$

$$\lambda_{dr}^{rf} = L_m i_{ds}^{rf} + L_r i_{dr}^{rf} = \frac{L_m}{\left(\frac{L_r}{r_r} p + 1\right)} = i_{ds}^{rf} \quad \text{(rotor flux equation) (11)}$$

The torque produced by an induction machine can be calculated as shown in (12), which is simplified from a general torque equation by the fact that it is calculated using rotor flux reference frame quantities; i.e.:

$$T = \frac{3}{2} \frac{P}{2} \frac{L_m^2}{L_r} i_{qs}^{rf} \lambda_{dr}^{rf} \tag{12}$$

When $i_{ds}^{rf}$ is held constant, (12) can be simplified to the form shown in (13) since $i_{dr}^{rf}$ will be equal to zero; i.e.:

$$T = \frac{3}{2} \frac{P}{2} \frac{L_m^2}{L_r} i_{qs}^{rf} i_{dr}^{rf} = \frac{1}{K_T} i_{qs}^{rf} i_{dr}^{rf} \tag{13}$$

In (13) a substitution was made for the parameters that scale the product of the q-axis and d-axis currents. This term is often called the torque gain, $K_T$, and is one of the parameters used in field orientation.

Equations (11) and (13) show one of the key advantages of field orientation; namely, its ability to independently control both the torque and the flux level in the machine. This independent control is achieved by using the d-axis stator current, $i_{ds}^{rf}$, to control the flux level and using the q-axis stator current, $i_{qs}^{rf}$, to control the torque level.

Substituting (10) and (11) back into the rotor voltage equation, (7), results in a relationship for the rotor slip frequency; i.e.:

$$s\omega_e = (\omega_e - \omega_r) = \frac{r_r}{L_r} \frac{L_m i_{qs}^{rf}}{\lambda_{dr}^{rf}} \tag{14}$$

When $i_{ds}^{rf}$ is held constant, (14) can be further simplified to the form shown in (15).

$$s\omega_e = (\omega_e - \omega_r) = \frac{r_r}{L_r} \frac{i_{qs}^{rf}}{i_{dr}^{rf}} \quad (15)$$

The slip relationships shown in (14) and (15) form the basis for one of the techniques used to implement a field orientation technique, called indirect field orientation (IFO). In IFO, the slip frequency of a machine is controlled so that it satisfies the relationship shown below in (16) (assuming constant $i_{ds}^{rf*}$). If the parameter estimates used in (16) are equal to the actual parameter, then (16) is a necessary and sufficient condition for obtaining the field oriented torque control of an induction machine (where * denotes a commanded value and ^ denotes an estimated value). Thus:

$$s\omega_e^* = \frac{\hat{r}_r}{\hat{L}_r} \frac{i_{qs}^{rf*}}{i_{ds}^{rf*}} = \frac{1}{\hat{\tau}_r} \frac{i_{qs}^{rf*}}{i_{ds}^{rf*}} \quad (16)$$

As can be seen from (16), the slip frequency necessary to obtain field oriented control is a function of the q-axis and d-axis stator currents and the rotor time constant, the inverse of which is commonly called the slip gain. Thus:

$$s\omega_e^* = \hat{K}_{slip} \frac{i_{qs}^{rf*}}{i_{ds}^{rf*}} \quad (17)$$

This slip frequency relationship, (17), can be integrated over time with the results added to the rotor position resulting in an estimate of the rotor flux angle. This calculation forms the basis of IFO and is shown in FIG. 1.

A steady-state approximation has been made for the flux dynamics in the previous equations and the block diagram shown in FIG. 1. This steady-state approximation for the flux dynamics is often made when implementing indirect field orientation, resulting in reduced performance, but the approximation is not required and is only done in this instance to simplify the description and the equations. It does not in any way limit the following description of methods of estimating slip gain.

The torque command in FIG. 1 is a current that is transformed to the rotor flux reference frame ($i_{qds}^{rf*}$). This is shown at 10 in FIG. 1. At block 12, the estimated slip gain is with by the q-axis and d-axis current components develop an estimated rotor flux position $\hat{\theta}_{rf}$ shown at 14. This involves the integration of the slip frequency $S\omega_e$ at the output side of block 12, as shown at 16. The output of block 16 is compared to the measured rotor position $\theta_r$ at 18. This is used by the reference frame transformation block 20 to develop a current value in the rotor flux reference frame, as shown at 22.

The values for the current at 10 and at 22 are compared and the result of that comparison is received, as shown at 24, by current regulator 26 to produce a commanded voltage that depends on the current difference. That voltage is transformed at block 28 to produce stationary reference frame stator voltage at 30.

At block 32, the voltage values are transformed at 32 from two-phase to three-phase and distributed to voltage source inverter 34, which provides the input to the induction machine 36.

Current from the voltage source inverter is transformed at 40 from three-phase to two-phase.

As shown in the previous derivation, the implementation of IFO in an induction machine drive depends on two machine parameters, the slip gain, $K_{slip}$, and the torque gain, $K_T$. Of these two, slip gain is the more important since it directly affects the dynamics of the torque production, as explained previously.

Many methods have been proposed for estimating the slip gain or rotor time constant of an induction machine, but most of these methods have been based on steady-state behavior of the induction machine drive and a second model for calculating the rotor flux angle, typically using what is termed the voltage model. The dependence of these methods on a second model makes the method sensitive to errors in additional parameters of the machine and places limits on the operating conditions under which parameter estimation can be performed. Other methods also have been developed that use direct torque measurements or special rotor speed trajectories to perform the tuning; but again, these methods have limited usefulness in most applications since they cannot be performed during normal operation of the electric machine drive or because they require special test fixturing and measurement equipment.

The present invention, in contrast, uses an estimation technique that does not have such shortcomings. The slip gain estimate, of course, is an estimate of rotor time constant since one is the inverse of the other.

The field orientation technique of the present invention provides a method for high performance control of the torque produced by the induction machine. It allows the induction machine to be used effectively over its full torque versus speed capability. The field orientation technique, furthermore, decouples the dynamics created by the changes in the flux level from the changes in the torque level. This is characteristic of a transient phenomenon of short duration. It is the key factor in determining the torque control bandwidth of the system.

Almost all of the slip gain or rotor time constant estimation techniques previously developed were based primarily on the steady-state behavior of the induction machine. For the most part, they ignored the information contained in the transient response of the machine to changes in either the torque or flux level when the IFO controller was incorrectly tuned.

Figure 2:
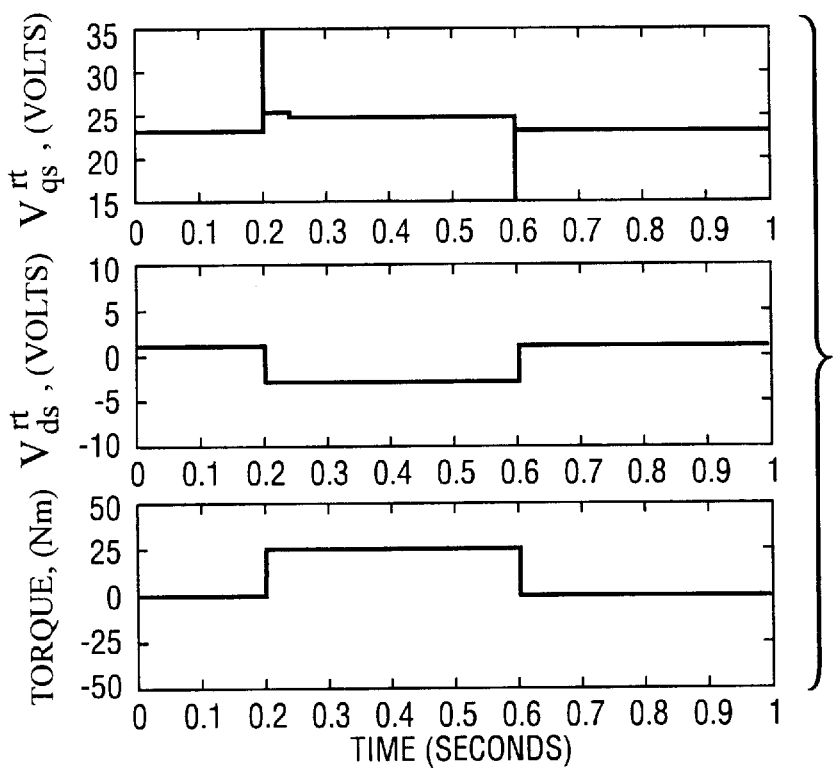
FIG. 2 is a simulated transient response chart showing the stator voltage in an indirect field oriented induction machine drive with the slip gain estimate correctly tuned.
Figure 3A:
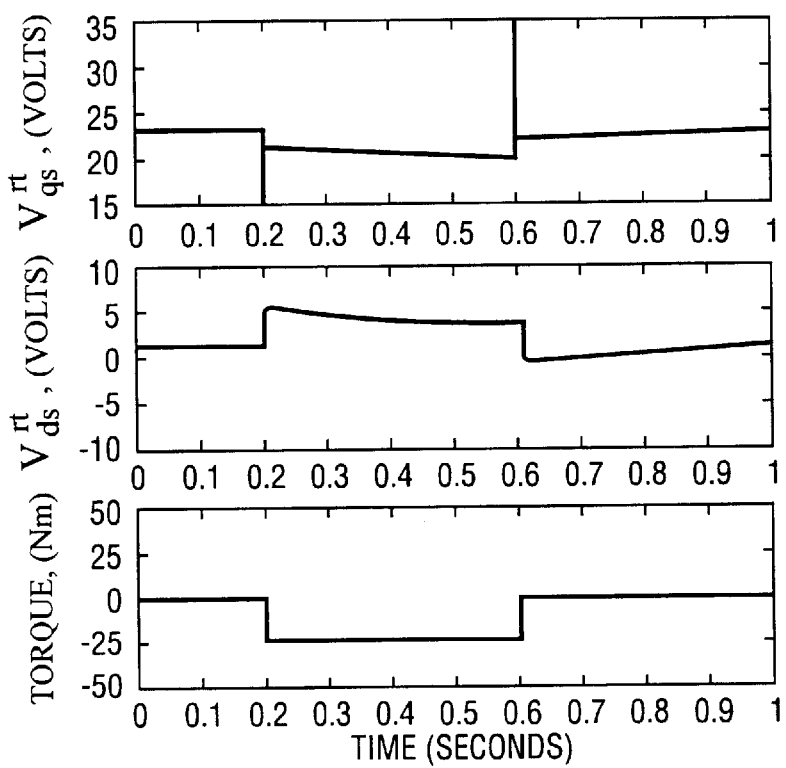
FIGS. 3a and 3b are graphs that show the slip gain estimate when the machine is in a generating mode, the slip gain estimate of FIG. 3a being 20% high and the slip gain estimate for FIG. 3b being 20% low.
Figure 3B:
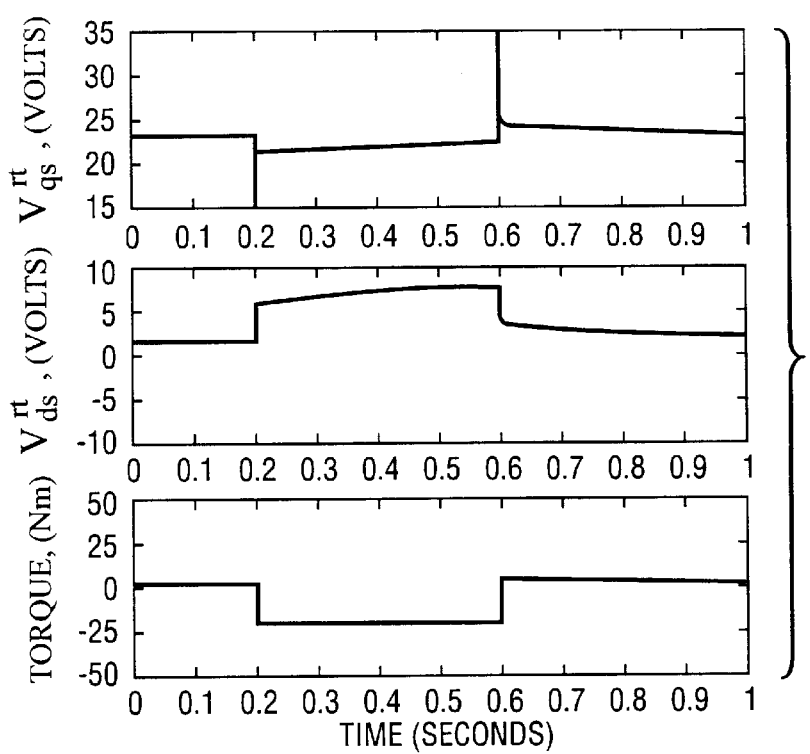
Figure 3C:
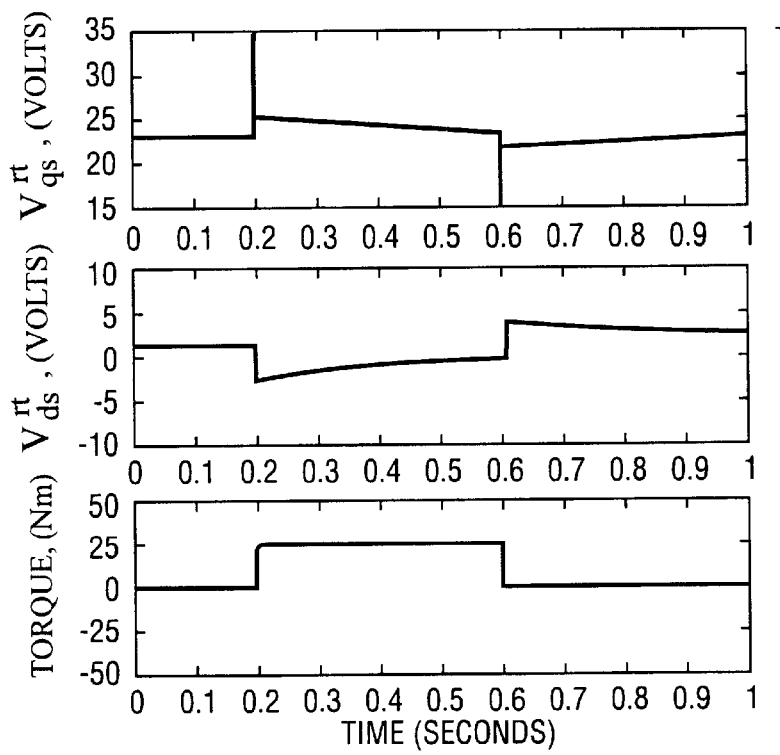
Figure 3B:
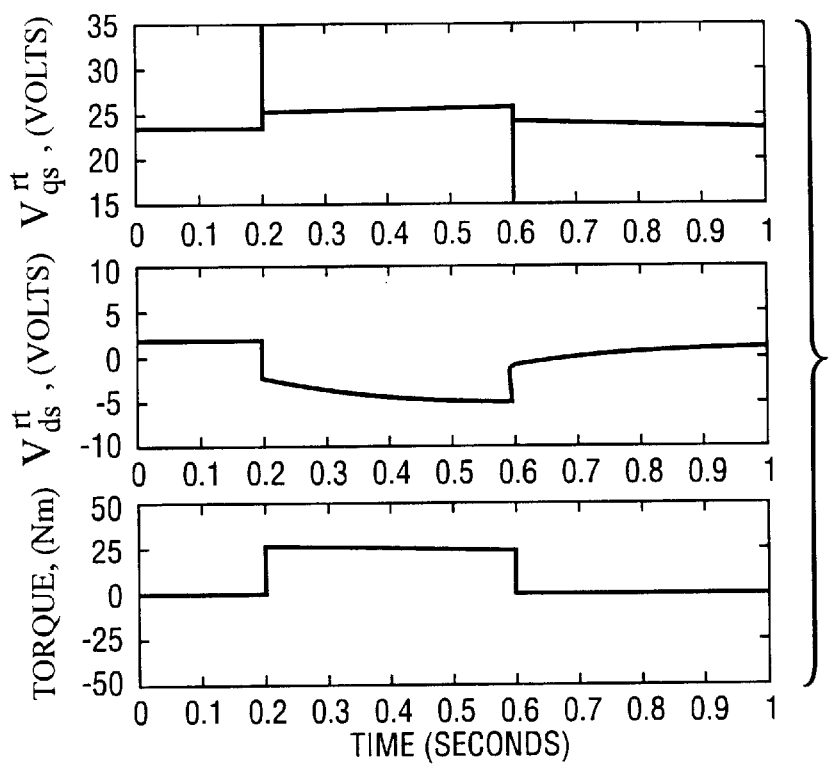

FIG. 2 shows an example of the transient in the stator q-axis and d-axis stator voltages for a step change in the q-axis stator current (torque command) when the slip gain estimate is correctly tuned. As can be seen in the figure, the q-axis and d-axis stator voltages exhibit almost no transients following a step change in the torque command when the slip gain estimate is correctly tuned.

FIGS. 3a–3d show examples of the transient in the stator q-axis and d-axis voltages for a step change in the q-axis stator current (torque command) when the slip gain estimate is incorrectly tuned. Comparing the results shown in FIGS. 2 and 3a–3d, a significant difference in the transient response of the stator voltage commands can be seen. It is this characteristic in the stator voltage transient response that forms the basis for the slip gain estimator of the present invention.

The reason for the difference in the transient behavior of the stator voltage when the slip gain estimate is correctly or incorrectly tuned can be understood by realizing that errors in the slip gain estimate result in the loss of the decoupled control of the torque and rotor flux level in the IFO controller. This cross-coupling between torque and rotor flux level changes, due to errors in the slip gain estimate, can be seen by plotting contours of constant rotor flux, stator current, slip frequency, and torque in the d-axis stator current versus q-axis stator current plane. An example of this plot is shown in FIG. 4.

Figure 4:
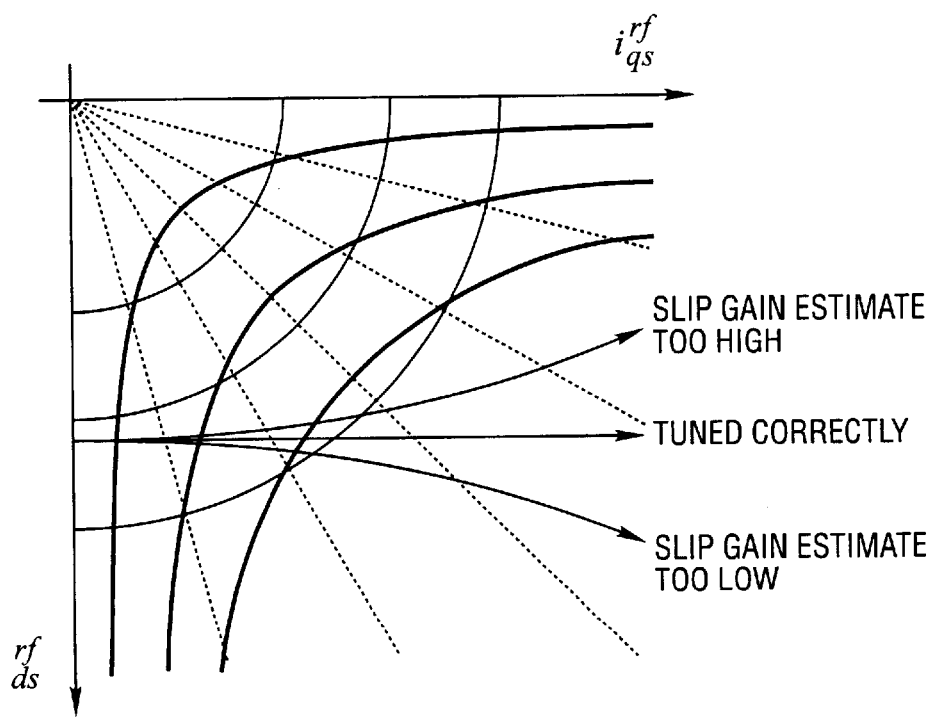
FIG. 4 is a plot in the qd stator current plane showing the effects of slip gain estimate errors on the torque and rotor flux level for changes in the torque command with a constant rotor flux level command.
Figure 5A:
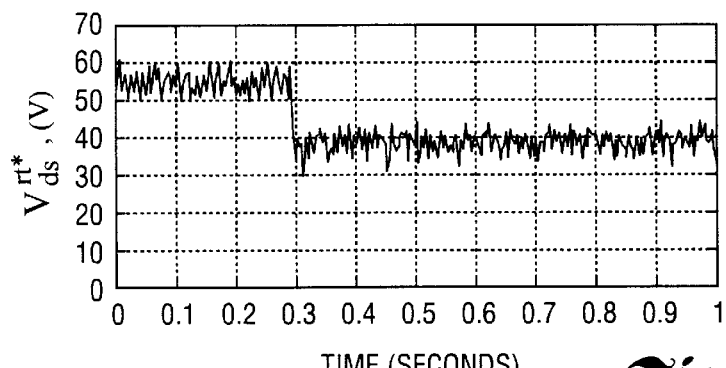
FIGS. 5a–5d show experimentally measured transient responses of the stator voltage command in an indirect field oriented induction machine drive, FIGS. 5a and 5c showing the behavior when the slip gain estimate is correctly tuned, and FIGS. 5b and 5d showing the behavior when the slip gain estimate is 33% low.
Figure 5B:
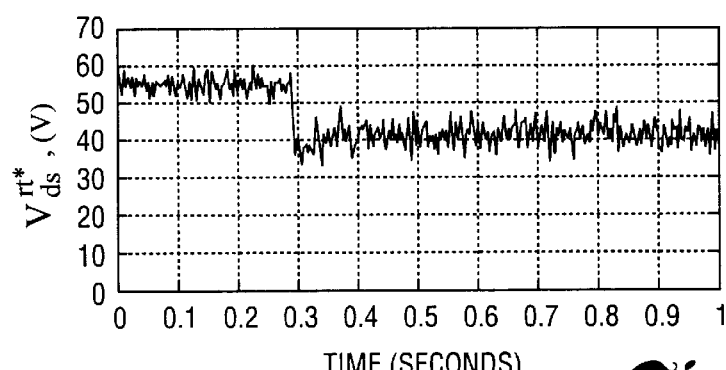
Figure 5C:
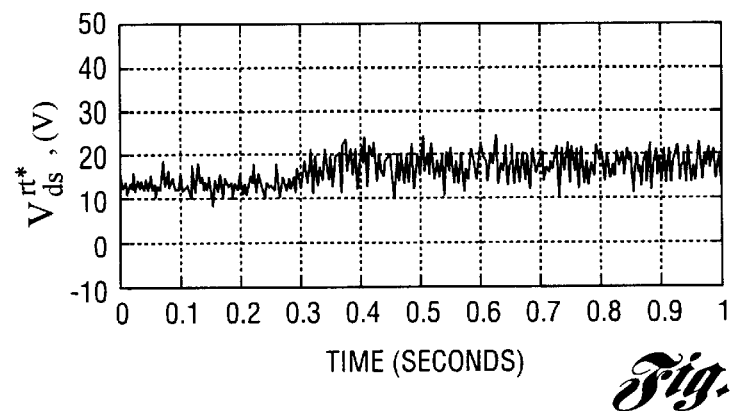
Figure 5D:
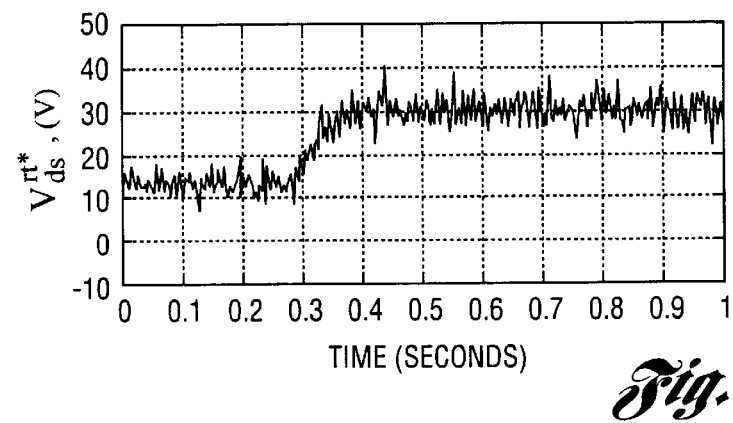

Constant rotor flux contours in FIG. 4 are horizontal lines, constant stator current contours are circles about the origin, constant slip frequency contours are lines emanating from the origin, and constant torque contours are hyperbolas.

From FIG. 4, it can be seen that when the slip gain estimate is too high, increases in the torque command (q-axis stator current command) cause the rotor flux level to decrease even though the rotor flux command remains constant. The opposite of this occurs when the torque command is decreased, with the slip gain estimate too high. Conversely, when the slip gain estimate is too low, increases in the torque command (q-axis stator current command) cause the rotor flux level to increase even though the rotor flux command stays constant. The opposite of this occurs when the torque command is decreased with the slip gain estimate too low. The relatively long rotor time constant (inverse of the slip gain) in most induction machines interacts with the changes in rotor flux level, causing rather pronounced transients in the stator voltage whenever the torque command or rotor flux command is changed. In contrast, when the slip gain estimate is correctly tuned, changes in the torque command do not cause changes in the rotor flux level, and there is no significant transient in the stator voltage.

FIGS. 5a–5d show examples of the experimentally measured transient response in the stator voltage command when the slip gain estimate is both correctly and incorrectly tuned. The experimental behavior agrees very closely with the simulation results shown in FIGS. 2 and 3a–3d.

After the transient response to a change in torque command is identified, the slip gain is estimated. The key to this calculation is whether the transient response shows a significant change in the rotor flux level. The relatively slow dynamics for rotor flux level changes makes this possible by collecting the stator voltage or stator voltage command values weighted by a windowing function or wavelet. Examples of potential windowing functions or wavelets are shown in FIGS. 6a–6c.

Figure 6A:
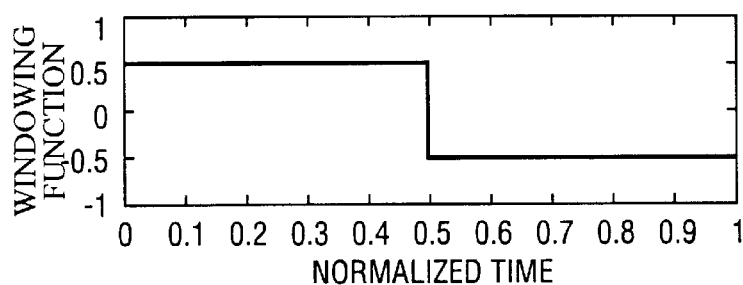
FIGS. 6a, 6b and 6c show windowing functions, FIG. 6a showing the windowing function for a 50% duty cycle square wave, FIG. 6b showing the windowing function for a 25% high duty cycle square wave, and FIG. 6c showing the exponential decay of the windowing function over time.
Figure 6B:
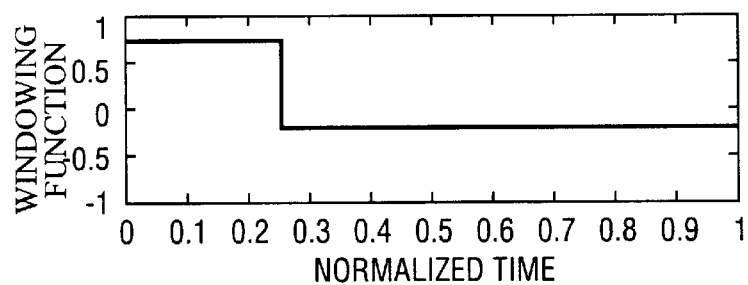
Figure 6C:
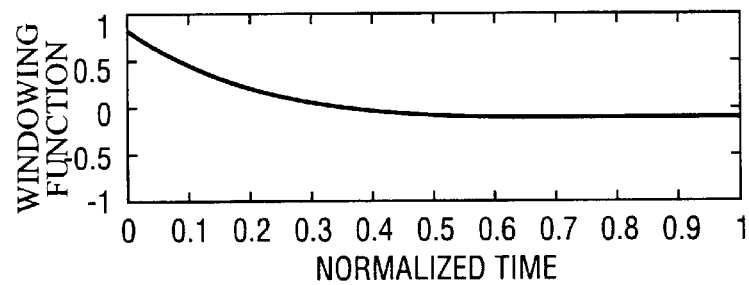

It should be noted that the windowing functions shown in FIGS. 6a–6c are meant as examples and are not meant to be an exhaustive representation of all potential windowing functions. The theory behind the use of the windowing functions, or wavelets, is similar to the theory behind using a Fourier series to represent a periodic waveform. The main difference is that the waveform of interest in this case is a transient waveform, not periodic.

Figure 7A:
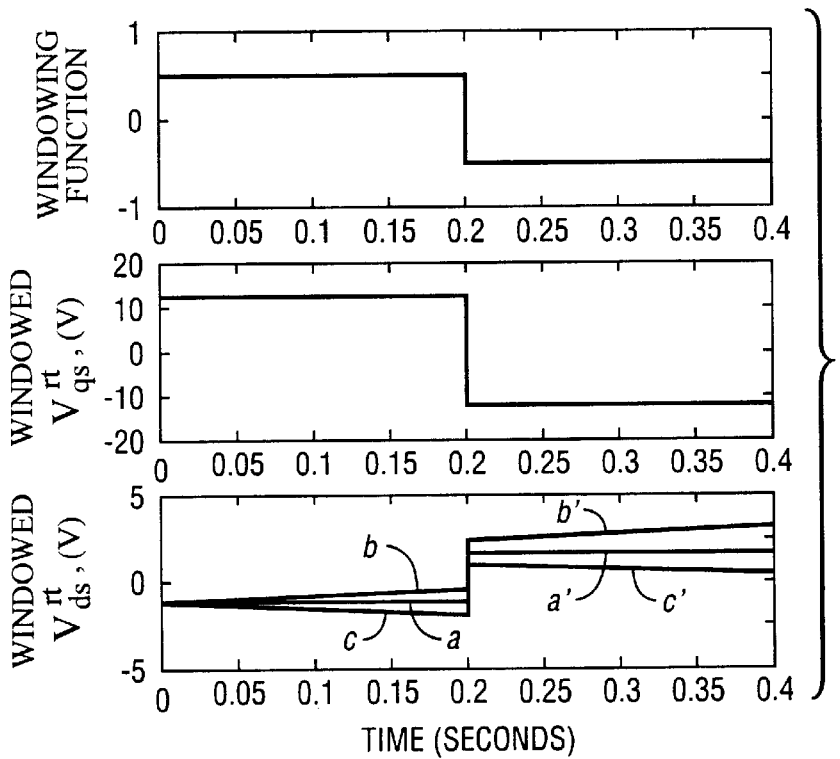
FIGS. 7a and 7b are examples of the windowed stator voltage transient response, FIG. 7a showing a 50% duty cycle square wave window, and FIG. 7b showing a 25% duty cycle square wave window.
Figure 7B:
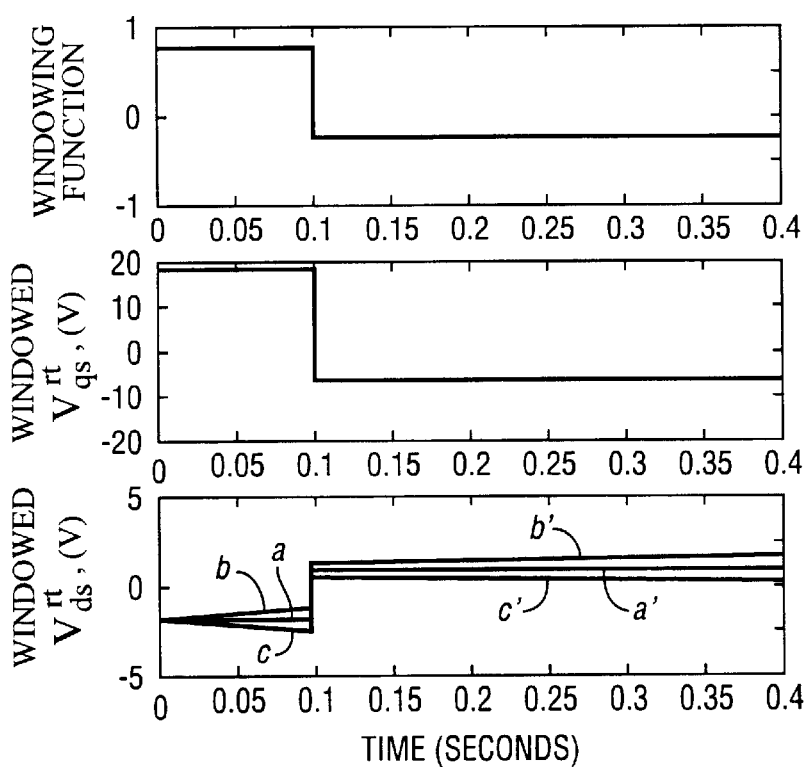

One key feature of all of the windowing functions shown in FIGS. 6a–6c is that they all enclose equal areas above and below the x-axis. Defining the windowing functions in this way causes the waveform that results from the multiplication of the windowing function with the stator voltage, after a change in the torque command, to have equal areas above and below the x-axis when the slip gain estimate is correctly tuned. (The stator voltage with the slip gain estimate correctly tuned has a constant magnitude immediately following any change in the torque command when the rotor flux command is held constant. Thus, the waveform that results from the multiplication of this constant times any of the windowing functions has equal areas above and below the x-axis.) Examples of the product of a windowing function and the stator voltage following a change in the torque command are shown in FIGS. 7a and 7b. The figure includes examples of the waveforms that result when the slip gain estimate is higher than the actual value, lower than the actual value, and correctly tuned. A correctly tuned estimate develops a response shown by lines "a" and "a'". When the estimate is higher than the actual, the estimate develops a response shown by lines "b" and "b'". When the estimate is lower than the actual, the estimate develops a response shown by lines "c" and "c'". The waveforms resulting from the multiplication of the windowing function with the stator voltage, when the slip gain estimate is correctly tuned, as explained previously, have equal areas above and below the x-axis.

Figure 8A:
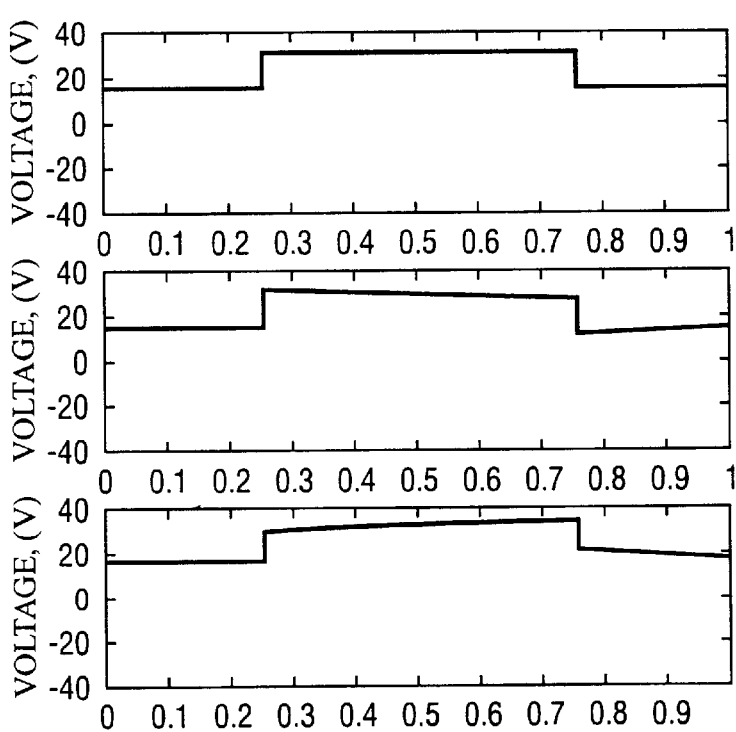
FIG. 8a shows unprocessed voltage waveforms.
Figure 8B:
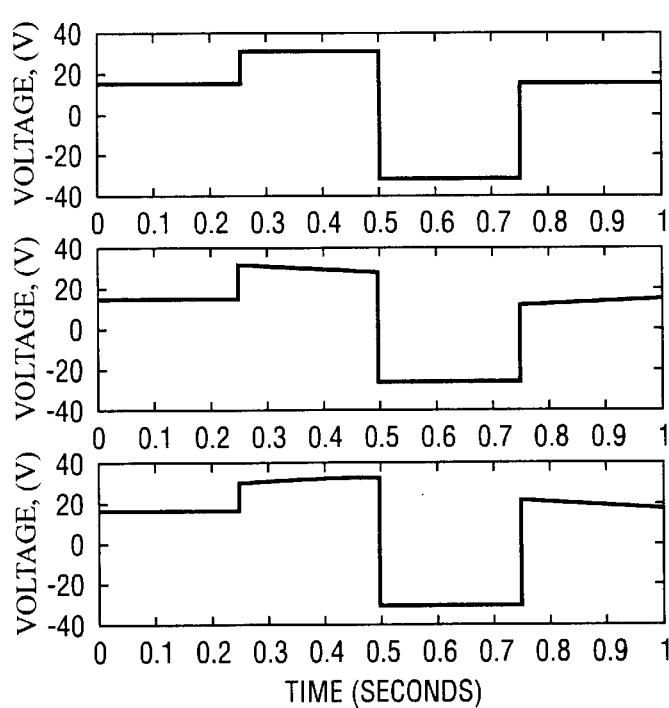
FIG. 8b shows processed windowed voltage waveforms.
Figure 8C:
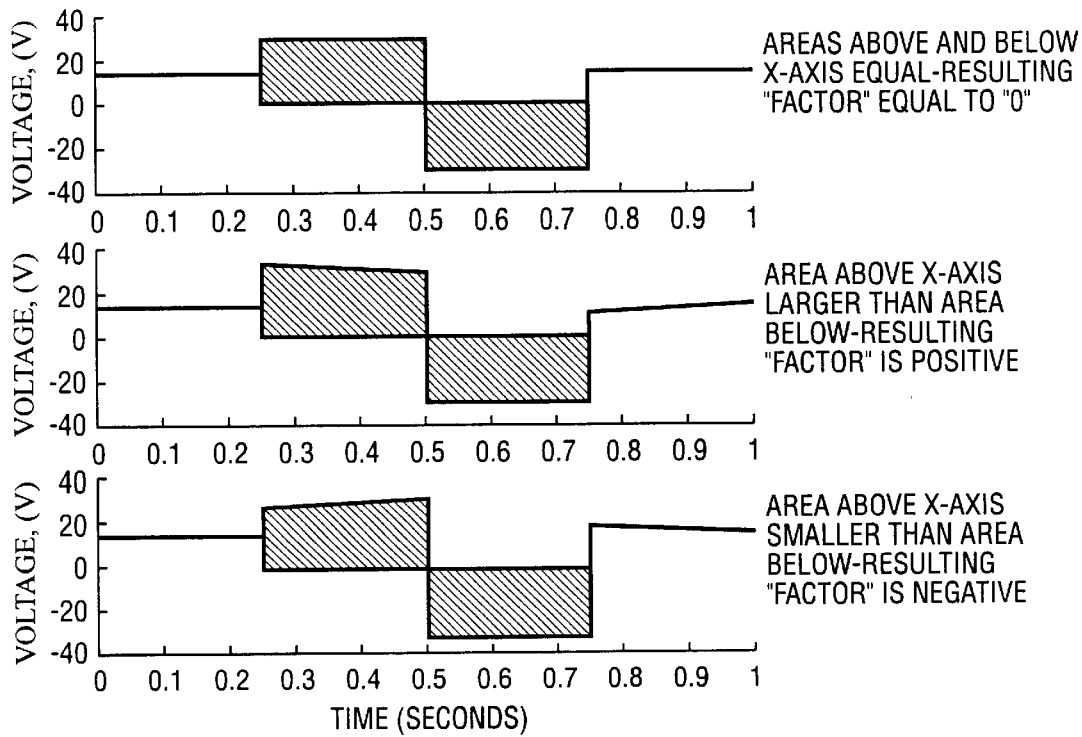
FIG. 8c shows windowed voltage waveforms with areas used in "factor" calculations highlighted.

FIGS. 8a–8c show expanded views of typical transient responses in the stator voltage and the windowed stator voltage. From this figure it can be seen that when the stator voltage does not show a significant transient, as would be the case with the slip gain estimate correctly tuned, the windowed stator voltage transient response has equal areas above and below the x-axis. On the other hand, when the stator voltage does show a transient, i.e., slip gain incorrectly tuned, the windowed stator voltage transient response no longer has equal areas above and below the x-axis. This difference in the areas above and below the x-axis of the windowed stator voltage waveform, when the slip gain estimate is mistuned, will be used to calculate what is termed a "factor". The magnitude and polarity of this "factor" will be in the input that forces the convergence of the slip gain estimation procedure, as explained subsequently.

The length in time of the windowing function, or wavelet, is another parameter that plays an important role in detecting the transient response in the collected data. This duration also determines how long data needs to be collected following any change in the torque command. The key requirement for the duration of the data collection, or length of the windowing function, is that it should not be either too short or too long, so that the transient does not appear significant in the data collected. Since the transient in the stator voltage is governed by the rotor time constant, a rough guideline for the length of time for data collection is that it be in the range of one to five rotor time constants, with significant leeway for either shorter or longer duration time periods. One concern that may be raised with this specification for the time period of the windowing function or data collection is that the rotor time constant, or slip gain, is not known since it is the purpose of the estimation procedure. This is not a significant problem since the time period for the windowing function or data collection does not have to be precise in length relative to the actual rotor time constant. Instead, it just needs to have roughly the same timescale as the rotor time constant, which is easily achieved.

Figure 9:
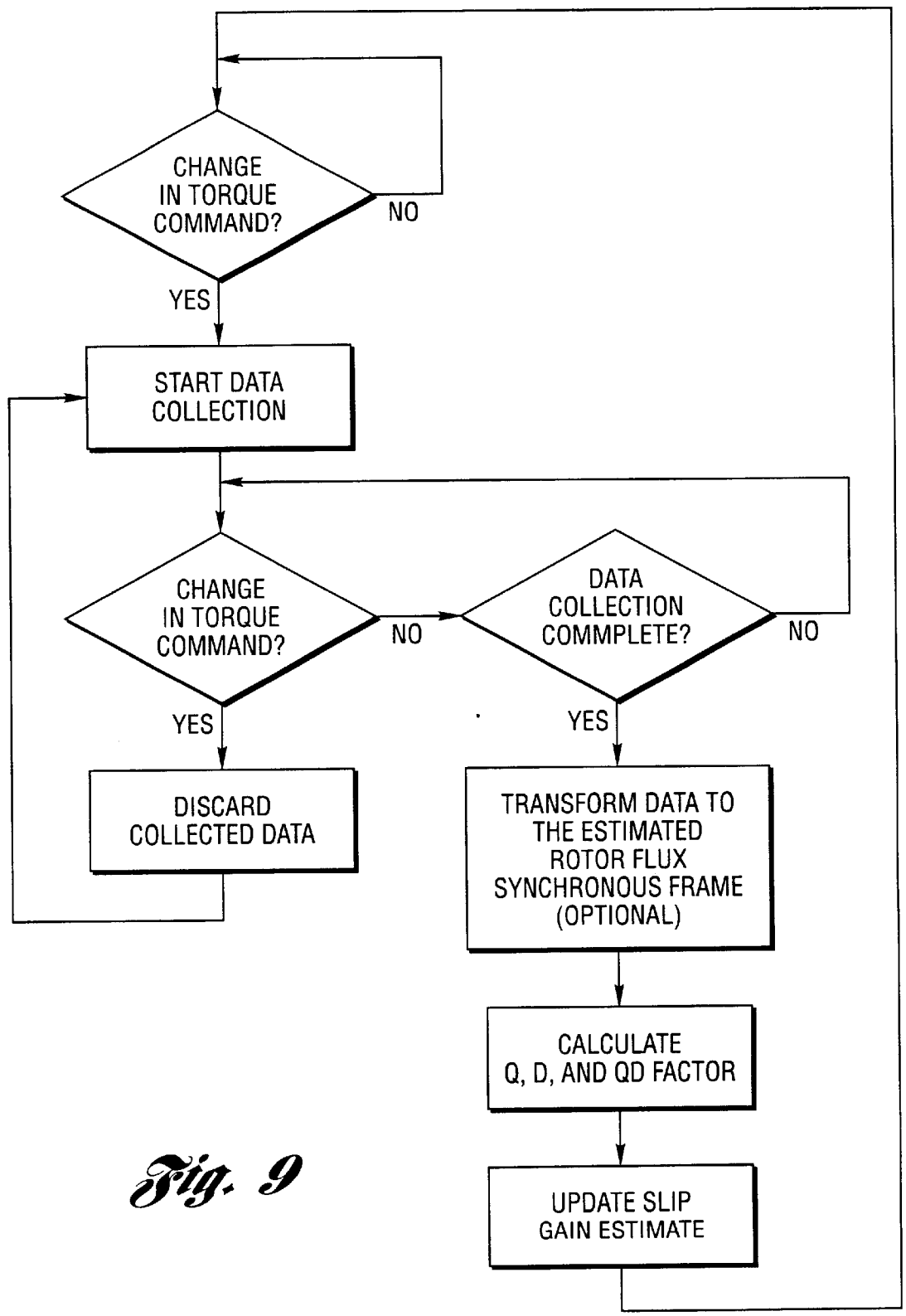
FIG. 9 is a flowchart of the procedure used to analyze transient content of the stator voltage and to correct the slip gain estimate.

Using the idea of measuring the stator voltage transients, weighted by a windowing function, a procedure can now be outlined for extracting information from the stator voltage transient response on the accuracy of the slip gain estimate following a change in the torque command. The general steps in this procedure are listed below and in the flowchart of FIG. 9.

1) Triggered by a change in the torque command, with the rotor flux command held constant, start collecting either the commanded or measured q-axis and d-axis stator voltages. If another torque command change occurs before finishing collecting data for the first torque command change, discard the data collected and start data collection again from the point of the latest torque command change.
2) If the stator voltage waveforms are not already in this reference frame, transform the stator voltage waveforms to the estimated rotor flux synchronous reference frame (note this step is not required, it just makes the single processing steps simpler and easier to follow).
3) Calculate the product of the collected stator voltage data and the desired windowing function or wavelet.

4) Calculate what are termed the Q and D factors for the current transient event as the time integral of the windowed q-axis and d-axis stator voltage waveforms, respectively. For a discrete time or sampled systems the time integral is just the summation of the windowed data.

5) Using the Q and/or D factor or a combination thereof (QD factor), determine whether the slip gain estimate is correctly tuned. If it is not, initiate the procedure for correcting the estimate based on the calculated Q, D, or QD factor for that transient event.

6) Repeat steps 1 through 4 after each change in the torque command for as long as the estimation procedure is enabled.

The definition for the Q and D factors discussed above are shown in (18) and (19) for a continuous time system, and in (20) and (21) for a discrete time or sampled system; i.e.:

$$Q\_Factor = \int_{t=0}^{t_f} W(t)v_{qs}^{rf} dt \quad (18)$$

$$D\_Factor = \int_{t=0}^{t_f} W(t)v_{ds}^{rf} dt \quad (19)$$

$$Q\_Factor = \sum_{k=1}^{n} W(k)v_{qs}^{rf}(k) \quad (20)$$

$$D\_Factor = \sum_{k=1}^{n} W(k)v_{ds}^{rf}(k), \quad (21)$$

where W(t) or W(k) is the desired windowing function, $t_f$ is the total amount of time that data is collected for, n is the total number of data samples collected, and $v_{qs}^{rf}$ and $v_{ds}^{rf}$ are either commanded or measured stator voltages in the estimated rotor flux synchronous reference frame.

Figure 10A:
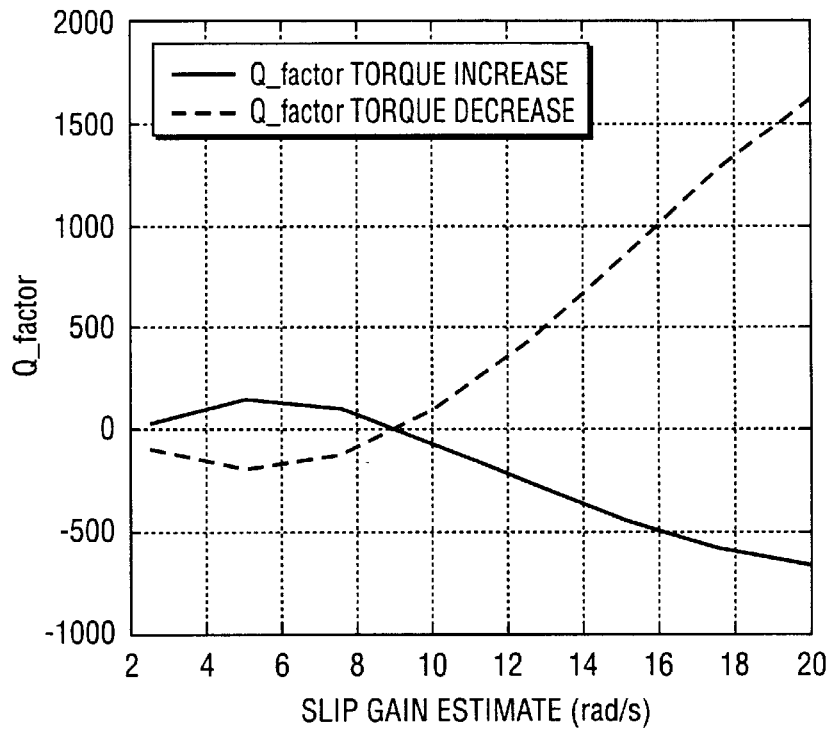
FIGS. 10a and 10b are graphs showing the q-factor and d-factor, respectively, during generating operation.
Figure 10B:
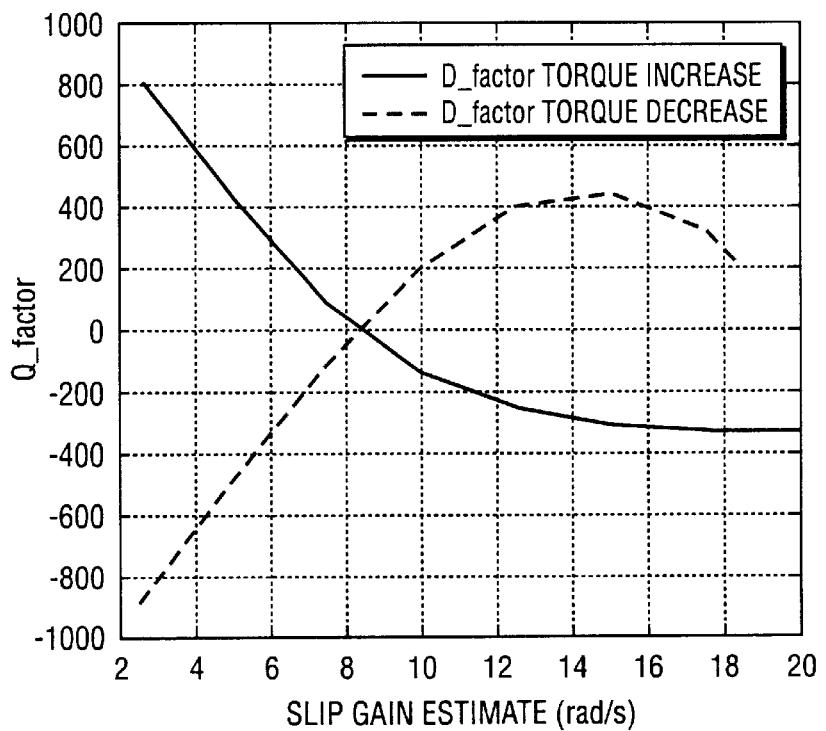
Figure 10C:
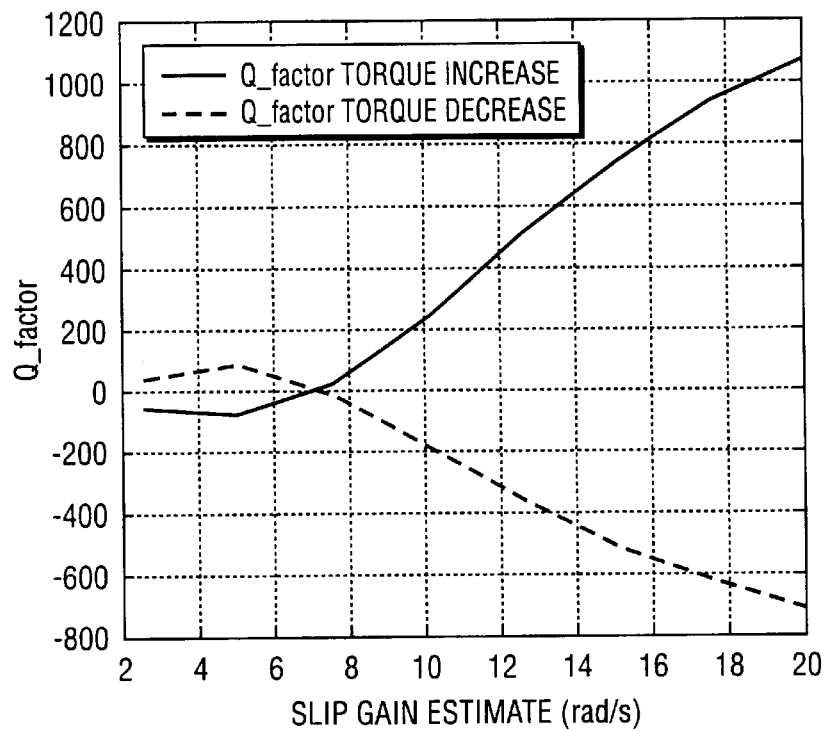
Figure 10B:
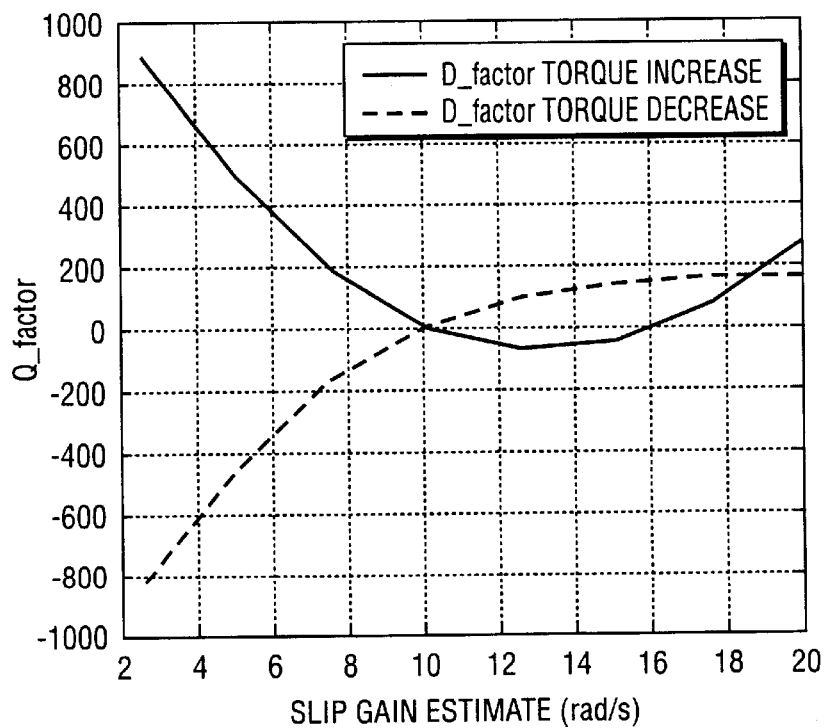

Examples of how the Q and D factor values change as a function of the slip gain estimate are shown in FIGS. 10a and 10b. In the figures, the Q and D factors for motoring operation and generating operation and for increasing and decreasing torque are shown as separate functions of slip gain estimate. The fact that the Q and D factor values depend on how the drive is operated (in monitoring mode or in generating mode) is because of the fact that each of these different modes affects the rotor flux level in a different way when the slip gain estimate is mistuned. This behavior can also be seen in FIGS. 3a–3d.

Although the behavior of the Q and D factor shown in FIGS. 10a and 10b show that they are definite and deterministic functions of the slip gain estimate, individually, the Q-factor and the D-factor do not exhibit a behavior that lend themselves to be used as the signal for correcting the slip gain estimate directly. The desired characteristics for such an error signal is that it have no inflection, and preferably a negative slope when plotted as a function of the term being controlled (the slip gain estimate in this case). The limitations in the Q and D factors individually can be solved by using a combination of the two factors, termed the QD factor. The procedure used to calculate this combined QD factor is shown in the following four cases, (22) through (25), and outlined in the flowchart shown in FIG. 11; i.e.:

Case 1: Motoring operation, torque command increasing (T*(k)>0 and T*(k)>T*(k−1)) QD_Factor=−Q_Factor+Factor (22)

Case 2: Motoring operation, torque command decreasing (T*(k)>=0 and T*(k)<T*(k−1)) QD_Factor=Q_Factor−D_Factor (23)

Case 3: Generating operation, torque command increasing (T*(k)<=0 and T*(k)>T*(k−1)) QD_Factor=Q_Factor+D_Factor (24)

Case 4: Generating operation, torque command decreasing (T*(k)<0 and T*(k)<T*(k−1)) QD_Factor=−Q_Factor−D_Factor, (25)

where T*(k) represents the torque command level after the change and T*(k−1) is the torque command level before the change.

Figure 11:
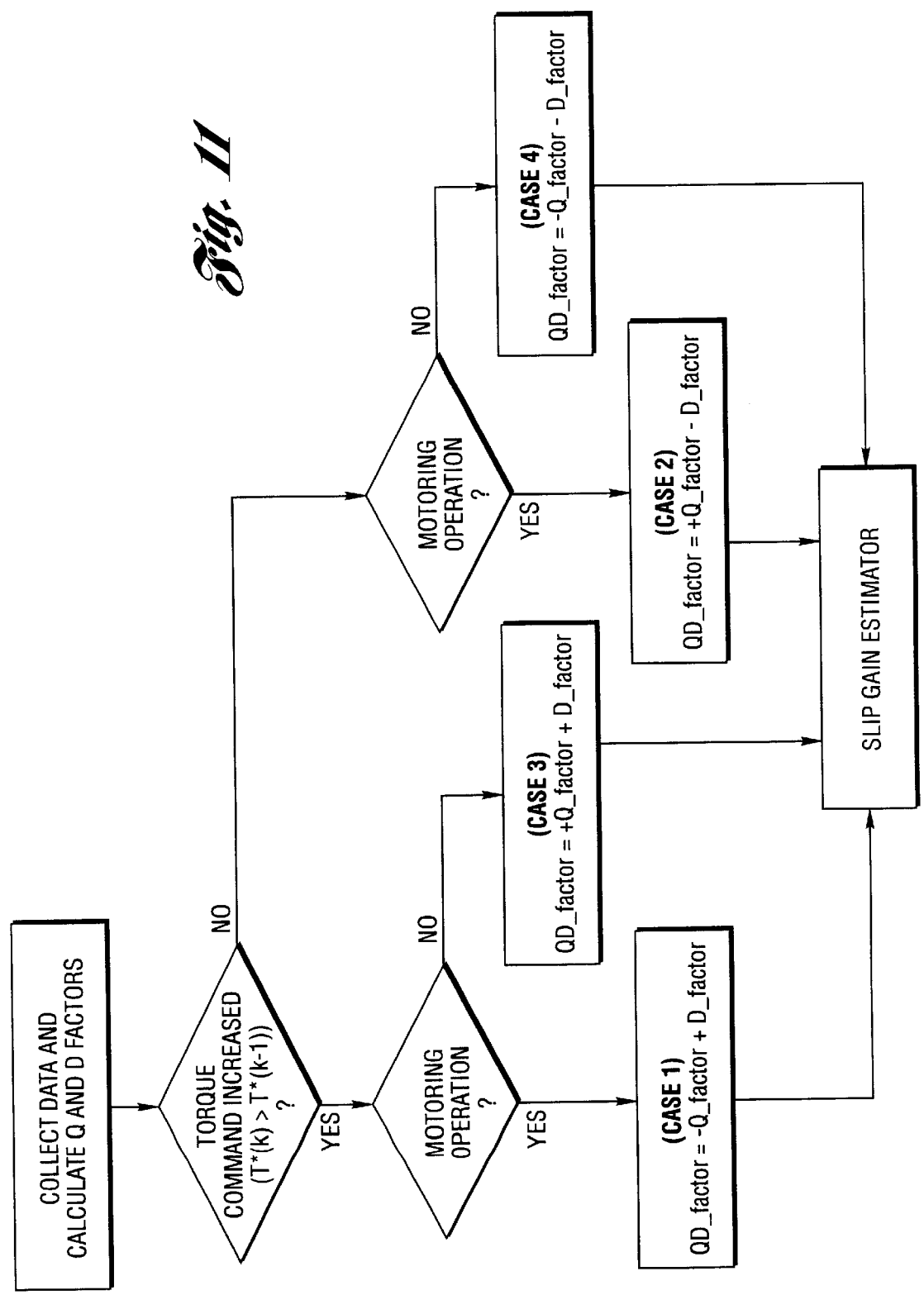
FIG. 11 is a flowchart of the procedure used to calculate the qd-factor.
Figure 12A:
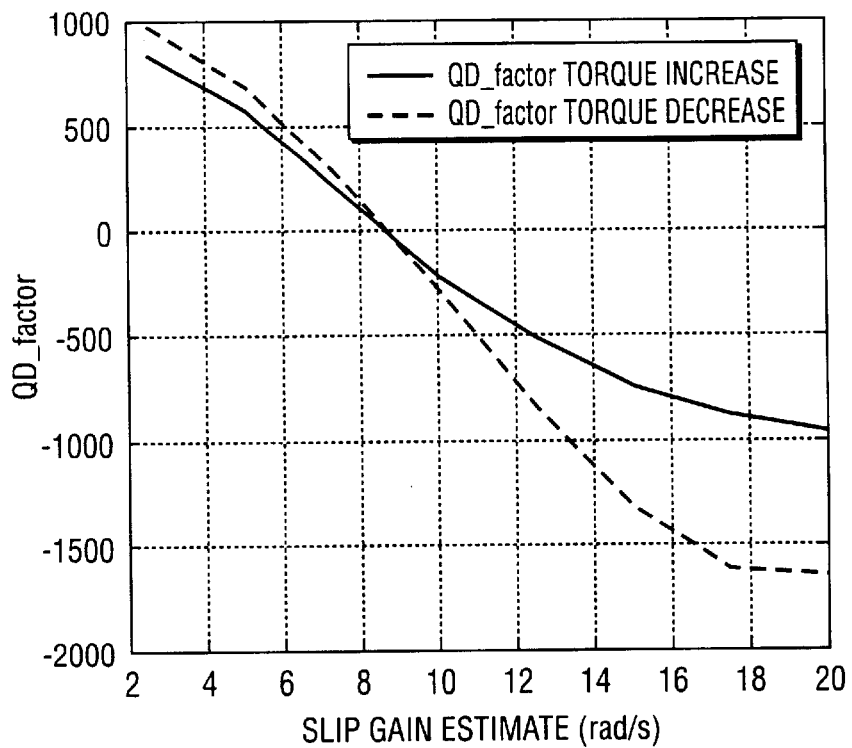
FIGS. 12a and 12b are graphs showing the relationship between the qd-factor and the slip gain estimate during generating operation and motoring operation, respectively.
Figure 12B:
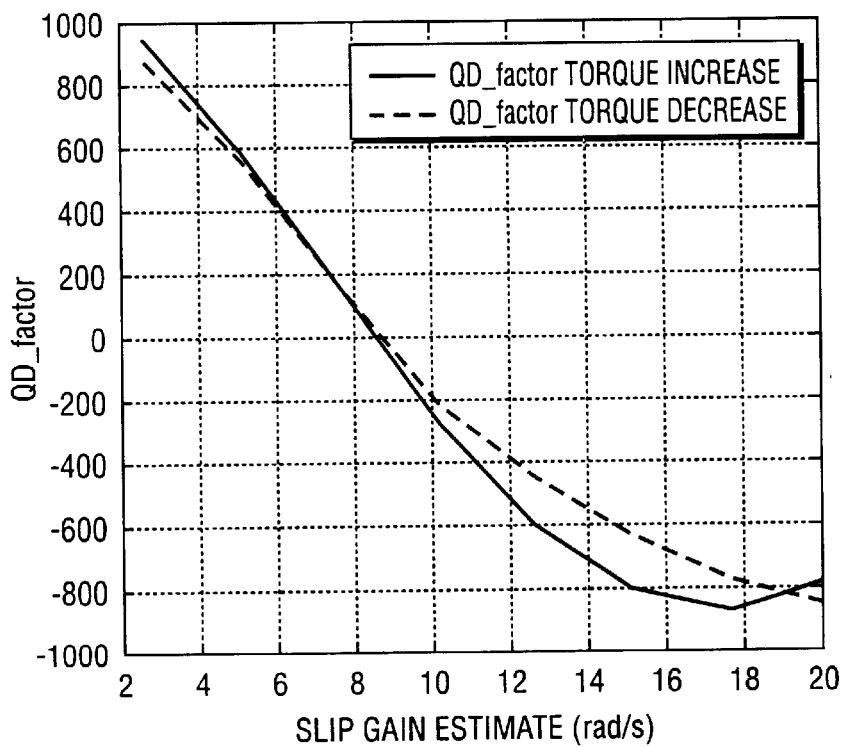

The QD factor that results from the routine of the flowchart shown in FIG. 11 and described by (22) and (25) is shown in FIGS. 12a and 12b. In the figures, the QD factor for motoring and generating operation and for increases and decreases in torque are shown as separate functions of the slip gain estimate. This was done because the QD factor calculated using the four cases outlined in (22) through (25) are not exactly equal, although they are very close. The key point feature of the QD factors shown in FIG. 12 is that all of them exhibit a negative slope as a function of the slip gain estimate and for the most part do not have any inflections.

Figure 13A:
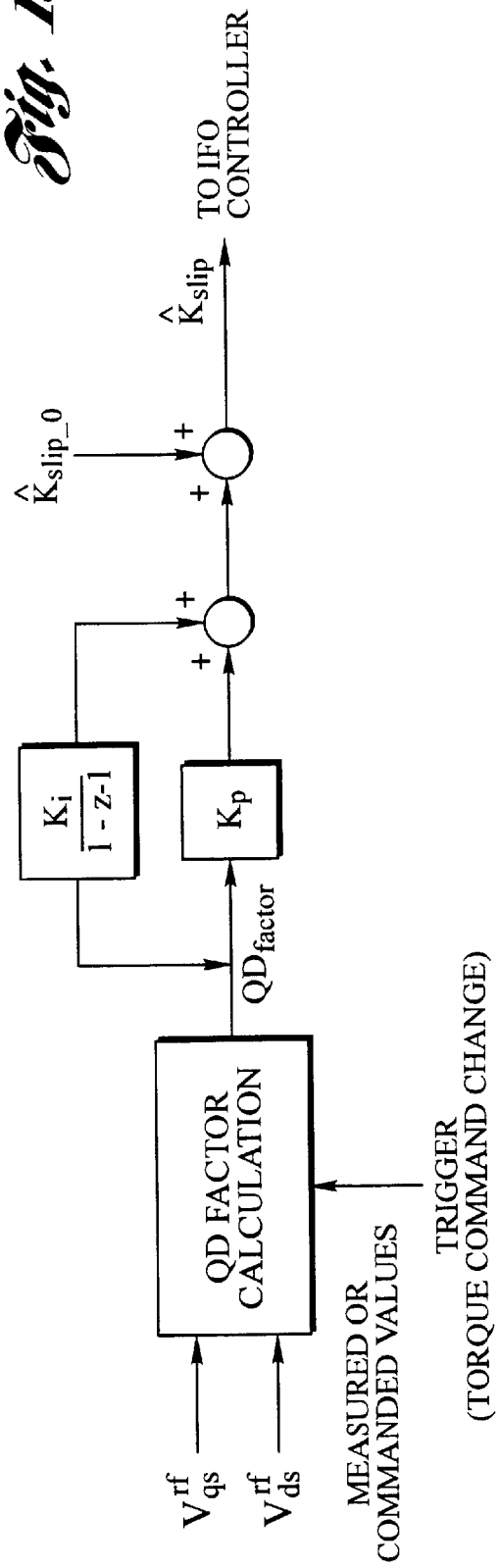
FIGS. 13a and 13b are block diagrams of two different versions of slip gain estimators based on the transient response of stator voltage.
Figure 13B:
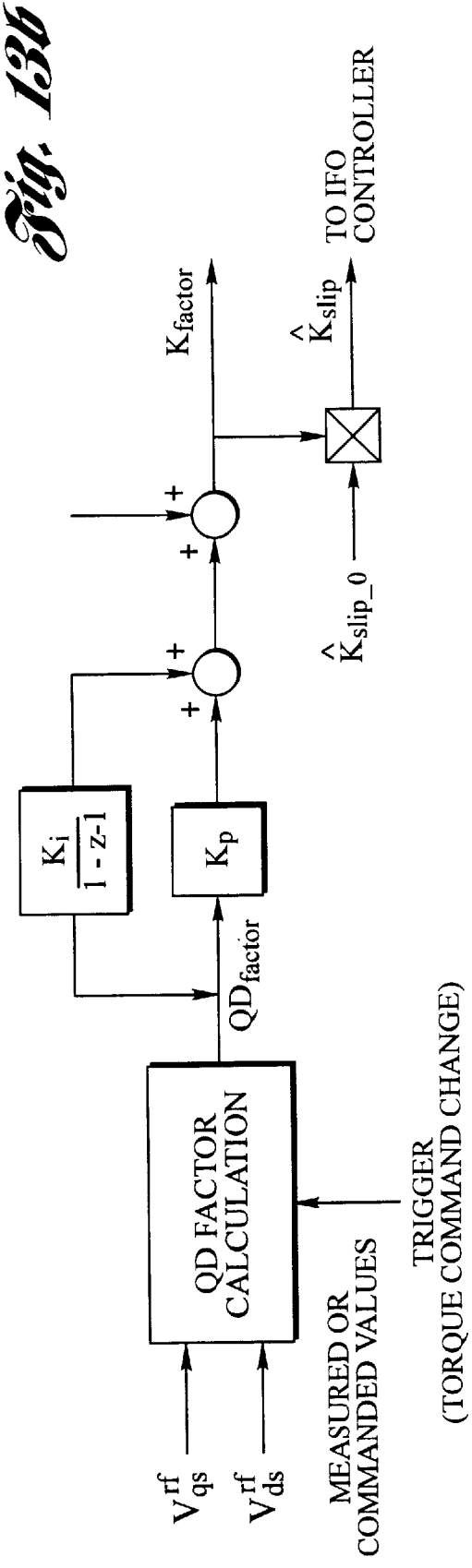

Two examples of how the QD factor can be used to drive the slip gain estimate to converge to the correct value of the slip gain are shown in FIGS. 13a and 13b. In these examples, the QD factor is used to drive a PI controller that produces an updated value for the slip gain estimate after each change in the torque command (with the rotor flux command held constant). One unique aspect of the estimators shown in FIG. 13 is that they only operate and produce an updated slip gain estimate once for each change in the torque command level. Because of this, the sample rate of the systems shown in FIG. 13 is determined by the changes in torque command and is much slower and asynchronous with respect to the faster control functions.

Figure 14A:
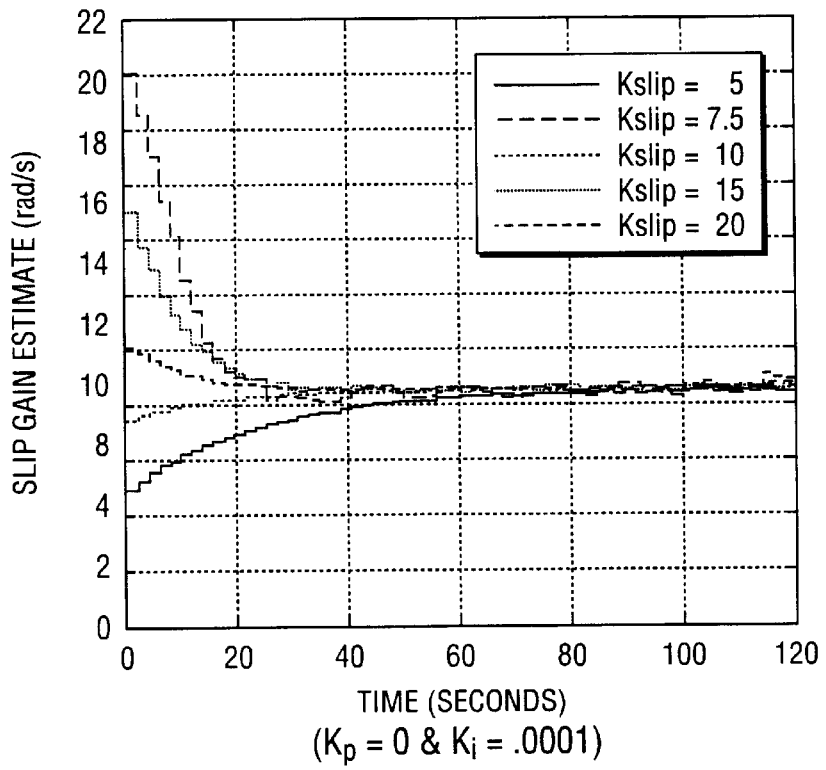
FIGS. 14a–14c are graphs showing experimental data that demonstrate convergence of slip gain estimates to the correct value from various initial incorrect values.
Figure 14B:
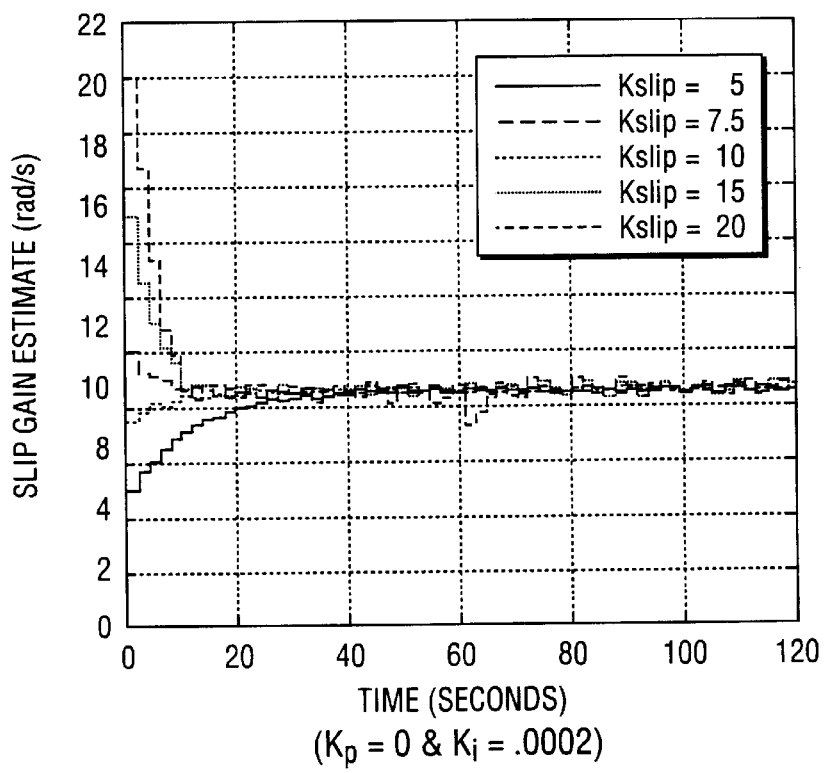
Figure 14C:
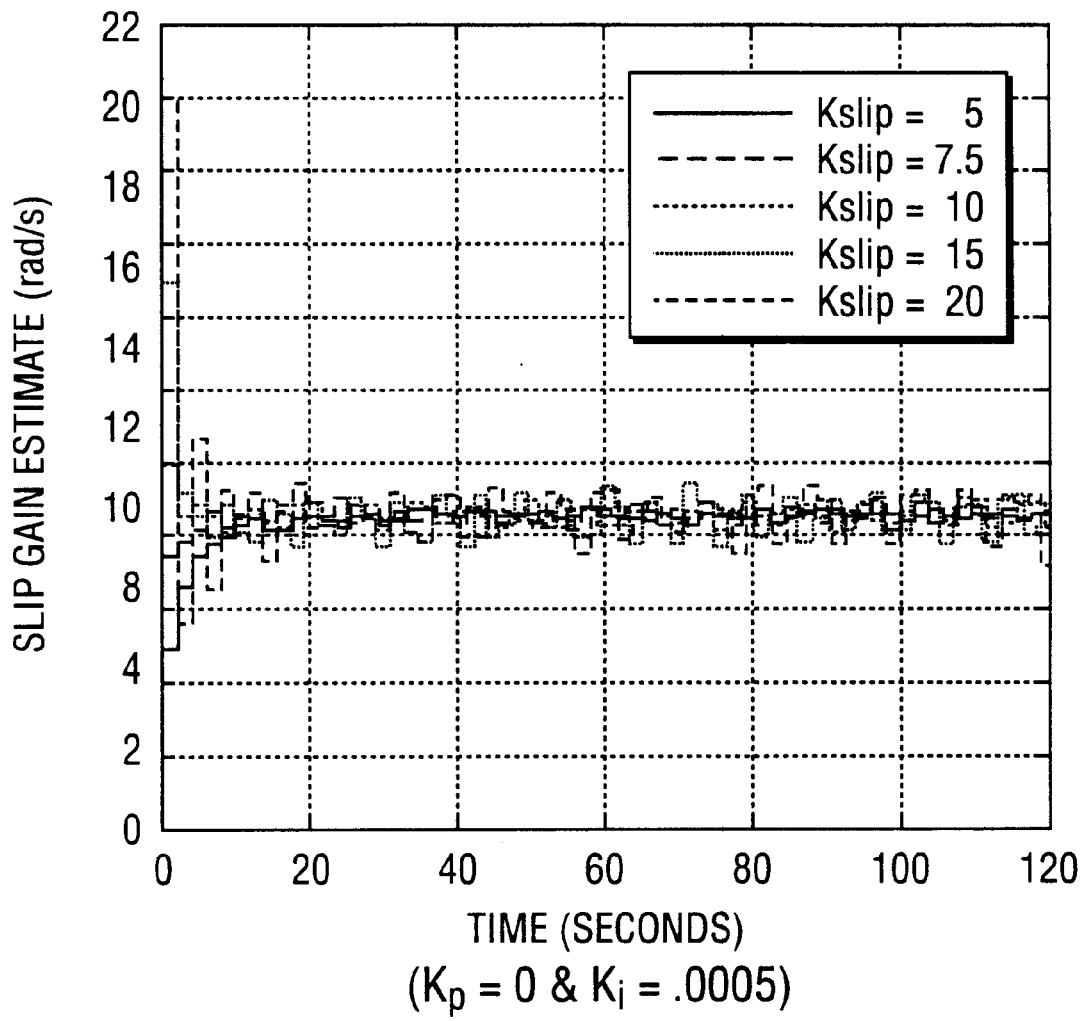

Experimentally collected data showing the convergence of the slip gain estimate from an initial incorrect value to the correct value using the estimator in FIG. 13b are shown in FIGS. 14a–14c. The three cases of estimator controller gains shown in FIGS. 14a–14c show that the rate of convergence of the slip gain estimate can be increased by increasing the gain of the estimator, as expected. Although $K_p$ was set equal to zero for all three cases shown in FIGS. 14a–14c, this is not a requirement. A non-zero $K_p$ value would increase the damping of the estimator and would help reduce oscillations or instabilities in the slip gain estimate. For example, a non-zero value of $K_p$ for the case shown in FIG. 14c might aid in reducing the relatively small oscillations seen in the slip gain estimate after it converges to the correct value.

The results shown in FIGS. 14a–14c also suggest the idea of using variable $K_p$ and $K_i$ gains for the estimator controller based on the magnitude of the QD factor. In a system such as this, the gains would be set to high values when the QD factor is large, resulting a faster convergence of the slip gain estimate to the correct value. Once the slip gain estimate error becomes small (small QD factor), the gains would be reduced resulting in less sensitivity to noise and greater stability in the slip gain estimate.

Another method would be to use a previously measured lookup table or curve fit of the Q, D, or QD factor as a function of the slip gain estimate to produce a corrected estimate of the slip gain. An idea related to this would be to make measurements for the Q, D or QD factors over a range of slip gain estimates. The correct value for the slip gain estimate could then be determined by the value that caused one or all of these factors to be zero. The advantage of this slip gain estimation procedure, compared to the estimator shown in FIGS. 13a and 13b, is that a very limited number of test points could be used to perform the tuning at each rotor flux and rotor speed level. Based on the results from these limited test points, a very accurate estimate of the slip gain can be obtained. In the minimum, the QD factor, for example, would need to be measured for only two slip gain estimates. Linear regression or interpolation could then be used to determine the value of the slip gain estimate that results in the QD factor being equal to zero. The accuracy of this simple interpolation procedure between two test points can be seen by looking at FIGS. 12a and 12b, which show examples of the experimentally measured variation in the QD factor as a function of the slip gain estimate. Of particular interest is the linearity of the various QD factor curves, especially near the intersection of the curves with the x-axis (the tuning of the slip gain estimate is correct at that point), and the close agreement among the various curves on the slip gain estimate at which this occurs. Similar relationships to this also exist for the Q and D factors.

Figure 15A:
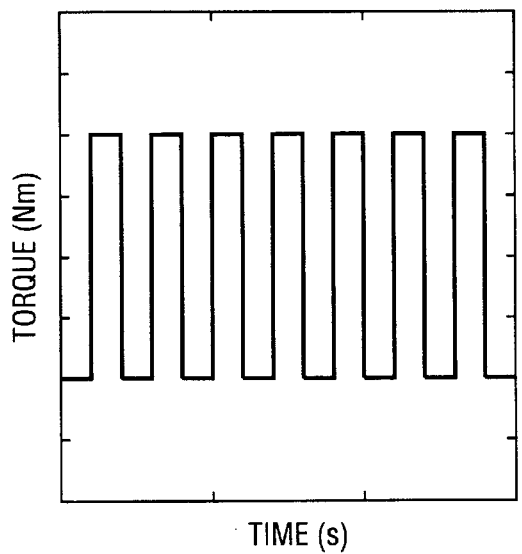
FIGS. 15a, 15b and 15c show examples of the torque command waveforms that can be used in the calibration method of the invention.
Figure 15B:
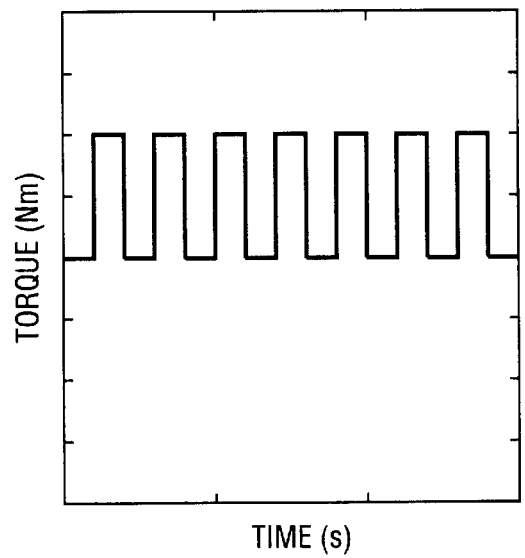
Figure 15C:
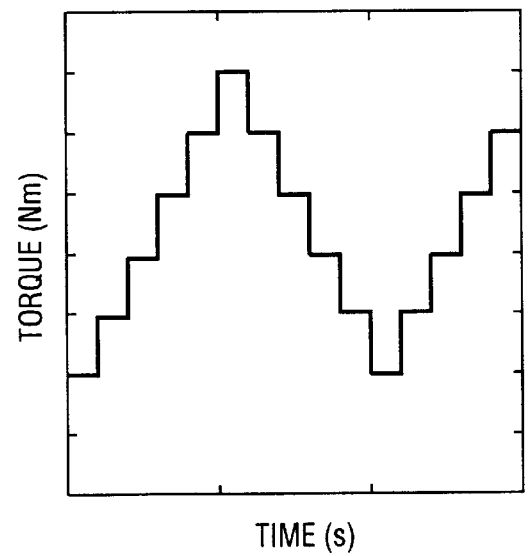

The key to using the slip gain estimation procedure described above with a self-calibrating procedure is the test sequence that produces the necessary transient response in the machine. A simple method for producing this transient response involves applying a variable torque command trajectory to the machine with a fixed or relatively fixed time period between changes in the torque level. Examples of such a torque command waveform are shown in FIGS. 15a, 15b and 15c. In the case of FIG. 15a, the torque is applied to the controller in steps separated by a period approximately equal to the duration of the torque pulse. The torque is varied in a uniform fashion between zero and a non-zero value. In the case of FIG. 15b, the torque steps take place between two non-zero values. In the case of FIG. 15c, the torque steps are variable and are ramped up to a peak and then ramped down to a zero value.

The torque command waveforms shown in FIGS. 15a, 15b and 15c are not meant to be exhaustive of all of the potential torque command waveforms that could be used in a self-commissioning procedure. In addition, it should be noted that the magnitudes, polarities and durations of the steps of the torque command waveforms shown in FIGS. 15a, 15b and 15c are merely examples. The actual magnitudes, polarities, and durations of the torque command steps would depend on the particular machine being tested, the application, and the operating condition (rotor flux level, rotor speed, etc.) at which the test is being performed.

The torque command waveforms shown in FIGS. 15a, 15b and 15c would be used to create the necessary transient response in the machine under test until the slip gain estimate converged to the correct value at each test point (rotor flux level, rotor speed). The rotor flux level or rotor speed would then be changed to the next test point and the procedure repeated. Experimentally measured examples of the convergence of the slip gain estimate to the correct value for different tunings of the slip gain estimator and errors in the initial slip gain estimate are shown in FIGS. 14a, 14b and 14c. From these plots, it can be seen that the slip gain estimate converges very rapidly and, accordingly, to the correct value of the slip gain.

In addition to using this procedure for self-calibration, it could also be repeated periodically during the lifetime of the induction machine drive, either in a complete or limited fashion, to fine tune and correct the calibration of the slip gain estimates used by the indirect field-oriented controller. This re-calibration could be scheduled to occur during times when the induction machine drive is not being used for other purposes so that the test procedure would not seriously affect the safety or drivability of the vehicle. The periodic re-calibration would correct for changes in the machine parameters as the drive is used; which may be caused by, among other things, changes in the air gap, breaking of rotor bars, shorting of stator windings, or even heating of the rotor during use.

The results of this re-calibration could also be used as a diagnostic tool to determine the health of the induction machine. A significant change in the calibrated parameters over the life of the machine would be a signal that some serious fault or degradation in the performance of the machine has or is about to occur. In a similar manner, the calibration procedure could be part of a specific diagnostic test, the results of which would aid in determining whether the machine is capable of meeting the required performance specifications and in determining where a potential failure in the machine has occurred.

An alternate method for estimating slip gain based on the machine's transient response also could be used during the self-calibrating procedure. This would include determining slip gain estimates as described generally in the co-pending patent application. This will produce the results shown in FIGS. 14a, 14b and 14c.

According to one of the alternate methods, the QD Factor can be determined for a range of slip gain estimates. The slip gain estimate value that results in the QD Factor being equal to zero is the correct tuning for the slip gain estimate. The advantage of this slip gain estimation procedure over that used for the results shown in FIGS. 14a, 14b and 14c is that a very limited number of test points could be used to perform the tuning at each rotor flux and rotor speed level. Based on the results from these limited test points, a very accurate estimate of the slip gain can be obtained. In the minimum, the QD Factor would need to be measured for only two slip gain estimates. Linear regression or interpolation could then be used to determine the value of the slip gain estimate that results in the QD Factor being equal to zero. FIGS. 12a and 12b show examples of the experimentally measured variation in the QD Factor as a function of the slip gain estimate in an induction machine drive. Of particular interest in the linearity of the various QD Factor curves that are shown, especially near the intersection of the curves with the x-axis (the correct tuning of the slip gain estimate), and the close agreement among the various curves on the slip gain estimate at which this occurs.

Although embodiments of the invention have been described, it will be apparent to persons skilled in the art that modifications may be made without departing from the scope of the invention. All such modifications and equivalents thereof are intended to be covered by the following claims.

What is claimed:

1. A self-calibration method for estimating slip gain of an induction machine system with a rotor and a fixed stator that form a torque flow path from a torque input member to a torque output member, the method comprising:

commanding a change in torque on the torque input member;

determining commanded q-axis and d-axis stator voltages;

calculating the product of the stator voltage and a desired windowing function, the windowing function being a multiplier for stator voltage following a change in torque command to effect a correctly tuned slip gain estimate;

calculating Q and D factors for a current transient event as a time integral of a windowed q and d axis stator voltage waveform;

determining, using Q and D factors, whether an estimate of slip gain is accurate; and correcting the slip gain estimate for a given change in commanded torque based on the Q and D factors relative to a slip gain estimate for a correctly tuned system; and repeatedly varying the commanded torque between predetermined values with a predetermined frequency, thereby creating a torque command waveform that causes the slip gain estimate to converge to an accurate value.

2. The self-calibration method as set forth in claim 1, wherein the Q factor and the D factor are expressed, respectively, as:

$$Q\_Factor = \int_{t=0}^{t_f} W(t) v_{qs}^{rf} dt$$

$$D\_Factor = \int_{t=0}^{t_f} W(t) v_{ds}^{rf} dt$$

where W is the windowing factor, rf is the reference frame, qs is the q-axis, ds is the d-axis, $t_f$ is the total amount of time for data collection and $v_{qs}^{rf}$ and $v_{ds}^{rf}$ are the stator voltages in the estimated rotor flux synchronous reference frame.

3. The method as set forth in claim 1, wherein the induction machine acts as a motor as torque is distributed through the torque flow path from the input member to the output member and as a generator as torque is distributed through the torque flow path from the output member to the input member;

the Q factor and the D factor relationship to slip gain estimates uniformly changing as slip gain estimates increase during both motoring operation and generating operation as torque command changes.

4. The method set forth in claim 2, wherein the induction machine acts as a motor as torque is distributed through the torque flow path from the input member to the output member and as a generator as torque is distributed through the torque flow path from the output member to the input member;

the Q factor and the D factor relationship to slip gain estimates uniformly changing as slip gain estimates increase during both motoring operation and generating operation as torque command changes.

5. The self-calibration method set forth in claim 1 wherein the torque command waveform comprises a pattern of uniform steps of commanded torque between zero and non-zero values.

6. The self-calibration method of claim 1 wherein the torque command waveform comprises a pattern of uniform steps of commanded torque between two non-zero values.

7. The self-calibration method of claim 1 wherein the torque commanded waveform comprises a pattern of progressively changing steps of commanded torque defining a progressively changing trajectory.

8. A self-calibrating control system for controlling torque in a torque transfer drive having a torque input member and a torque output member, the system including a programmable digital processor having a memory in which control algorithms are stored and a central processor unit for executing control processing steps in accordance with control algorithm instructions, the steps comprising:

commanding a change in torque on the torque input member;

determining commanded q-axis and d-axis stator voltage;

calculating the product of the collected stator voltage and a desired windowing factor, the windowing factor being a multiplier for stator voltage following a change in torque command to effect a correctly tuned slip gain estimate;

calculating Q and D factors for a current transient event as a time integral of a windowed q and d axis stator voltage waveform;

determining, using Q and D factors, whether an estimate of slip gain is accurate;

correcting the slip gain estimate based on the Q and D factors for a given change in commanded torque relative to a slip gain estimate that is correctly tuned; and repeatedly varying the commanded torque between predetermined values with a predetermined frequency, thereby creating a torque command waveform that causes the slip gain estimate to converge to an accurate value.

9. The self-calibrating control system as set forth in claim 8, wherein the Q factor and the D factor are expressed, respectively, as:

$$Q\_Factor = \int_{t=0}^{t_f} W(t) v_{qs}^{rf} dt$$

$$D\_Factor = \int_{t=0}^{t_f} W(t) v_{ds}^{rf} dt$$

where W is the windowing factor, rf is the reference frame, qs is the q-axis, ds is the d-axis, and $t_f$ is the total amount of time for data collection and $v_{qs}^{rf}$ and $v_{ds}^{rf}$ are the stator voltages in the estimated rotor flux synchronous reference frame.

10. The system of claim 8 wherein the torque command waveform comprises a pattern of uniform steps of commanded torque between zero and non-zero values.

11. The system of claim 8 wherein the torque command waveform comprises a pattern of uniform steps of commanded torque between two non-zero values.

12. The system of claim 8 wherein the torque commanded waveform comprises a pattern of progressively changing steps of commanded torque defining a progressively changing trajectory.

* * * * *